No. 819,947. PATENTED MAY 8, 1906.
J. STRACK.
NUT LOCK.
APPLICATION FILED MAR. 7, 1905.
2 SHEETS—SHEET 1.
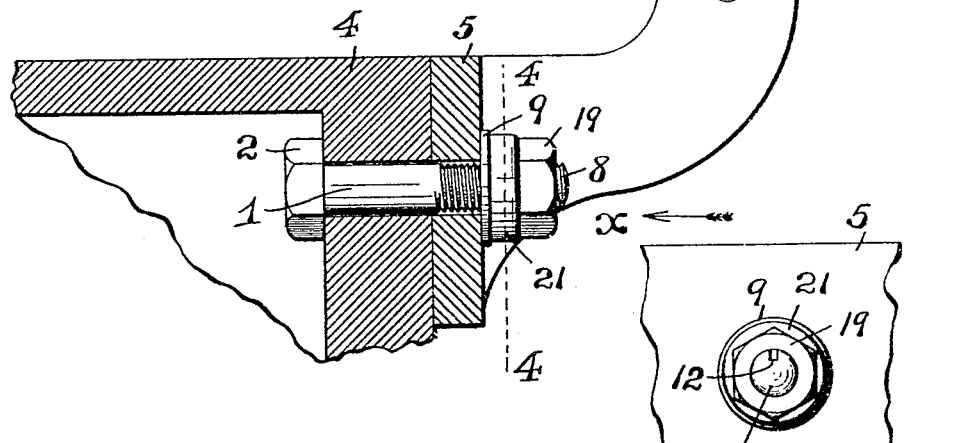
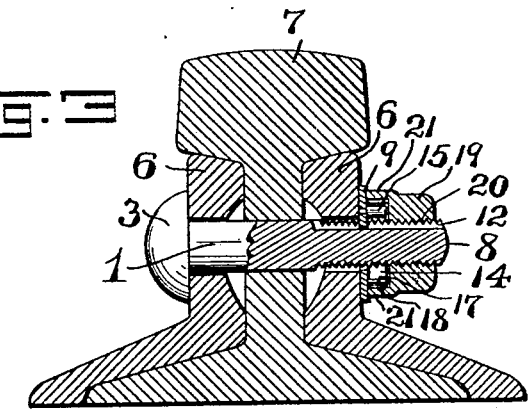
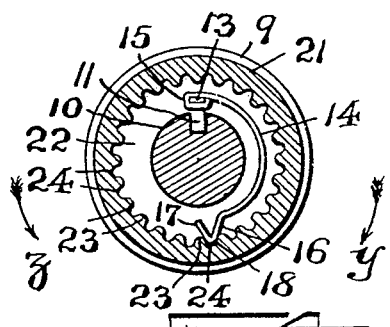
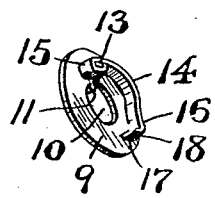
WITNESSES
Geo. D. Richards,
Harry G. Hallen
INVENTOR:
John Strack,
BY
Fred C. Fraentzel,
ATTORNEY

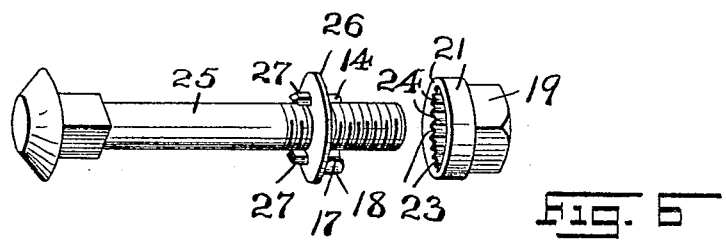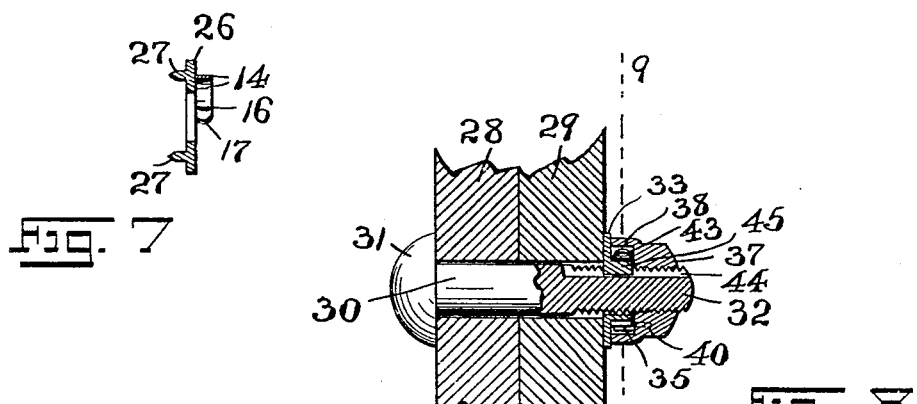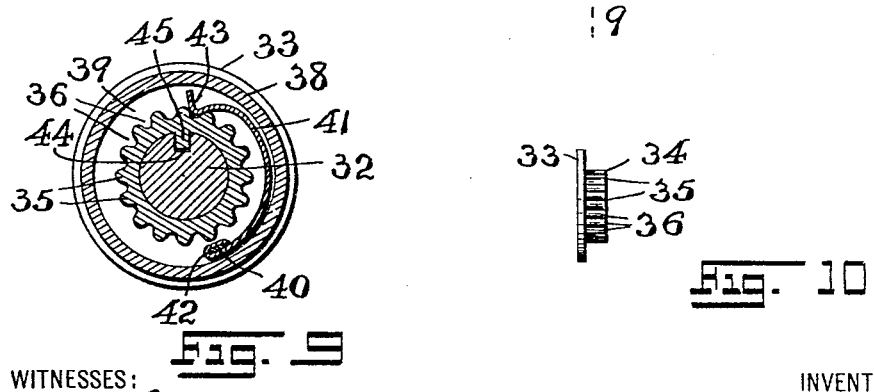

UNITED STATES PATENT OFFICE.

JOHN STRACK, OF NEWARK, NEW JERSEY, ASSIGNOR OF ONE-HALF TO FRANK BRABSON, OF NEWARK, NEW JERSEY.

NUT-LOCK.

No. 819,947.    Specification of Letters Patent.    Patented May 8, 1906.

Application filed March 7, 1905. Serial No. 248,827.

*To all whom it may concern:*

Be it known that I, JOHN STRACK, a citizen of the United States, residing at Newark, in the county of Essex and State of New Jersey, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The present invention has reference generally to improvements in nut-locks; and the invention relates more particularly to a novel nut-lock and nut for bolts and axles with a view of providing a simple device of the general character hereinafter more fully set forth which permits of the nut to be easily screwed upon the screw-threaded end of the bolt or axle, but prevents the accidental displacement and loosening of the nut upon such screw-threaded portion, especially when subjected to great jarring.

My present invention, therefore, has for its principal objects to provide a simply-constructed nut-lock and nut for bolts of the various kinds and for the axles of vehicles which prevents the accidental displacement of the nut from the screw portion of the bolt or axle, but which is of such construction that the nut can be removed at any time from the bolt or axle by the application of a wrench upon the sides of the nut, but is otherwise immovably affixed upon the said screw portion of the nut or axle.

A further object of this invention is to provide a nut-lock construction in which the parts have been reduced to a minimum and which is especially adapted for use on bolts for securing together the various parts of machines or the fish-plates to rails and for use, further, on vehicle-axles or other places where the screw-threaded end of the axle or bolt is clear and free, thereby providing a lock which shall be of a cheap and simple construction and shall be most effective in its operation.

With the various objects of my present invention in view the said invention consists, primarily, in the novel nut-lock and nut hereinafter set forth, and, furthermore, this invention consists in the various arrangements and combinations of parts, as well as in the details of the construction of the same, all of which will be hereinafter more fully described and then finally embodied in the clauses of the claim, which are appended to and form an essential part of this specification.

The invention is clearly illustrated in the accompanying drawings, in which—

Figure 1 is a sectional representation of two parts of a machine, with a side view of a machine-bolt provided with a nut-lock and nut embodying the principles of this invention, said view showing the nut screwed down tightly against accidental displacement or loosening of the nut upon the screw-threaded end portion of the bolt; and Fig. 2 is an end view of the said parts looking in the direction of the arrow $x$ in said Fig. 1. Fig. 3 is a transverse section of a rail and fish-plates, with a longitudinal section of a bolt and nut-lock and nut made according to the principles of this invention; and Fig. 4 is a transverse section on an enlarged scale, said section being taken through line 4 4 in said Fig. 1 of the drawings, the spring, however, being shown in elevation. Fig. 5 is a perspective view of a washer and connected holding or locking spring. Fig. 6 is a perspective view of an ordinary carriage-bolt provided with a nut-lock and nut embodying the improvement, and Fig. 7 is a cross-section of the form of washer employed in the construction shown in said Fig. 6. Fig. 8 is a longitudinal vertical section of a bolt, nut-lock, and nut of a slightly-modified construction, but still embodying the principal features of this invention. Fig. 9 is a transverse section, on an enlarged scale, the said section being taken on line 9 9 in said Fig. 8, with the washer shown in elevation; and Fig. 10 is a side view of the washer employed in the construction shown in said Figs. 8 and 9.

Similar characters of reference are employed in the above-described views to indicate corresponding parts.

Referring now to the said drawings, the reference character 1 indicates a bolt, which may be provided with the polygonal head 2, as shown in Fig. 1, or with a spherical head 3, as represented in Fig. 3 of the drawings, the said bolts being used with any suitable pieces of machinery, as 4 and 5, or for securing the fish-plates 6 upon opposite sides of the web of a rail 7, as illustrated in said Figs. 1 and 3 of the drawings.

Upon the screw-threaded portion 8 of the bolt is slipped a disk washer 9, having a central opening 10, with a teat or projection 11 extending into said opening, the said teat or projection 11 being arranged and projecting into a longitudinally-extending slot or groove 12, formed in the screw-threaded portion 8 of the bolt 1, substantially in the manner illustrated in Figs. 2, 3, and 4 of the drawings. The said disk or washer 9 is provided with a laterally-extending post or projection 13, which may be of any suitable configuration, whether square, triangular, cylindrical, or oblong, and has attached thereto by means of a suitable holding portion 15 a spring 14. This said spring 14 is curved substantially in the manner shown in Figs. 4 and 5 of the drawings and has on its other free end portion a holding or locking member 16. This holding or locking member 16 is preferably of the V-shaped configuration shown, having the free end 17 and the lower rounded edge 18, substantially as shown and for the purposes to be presently more fully described.

The nut is indicated by the reference character 19, having the usual screw-threaded hole 20 for screwing it upon the screw-threaded end portion 8 of the bolt, the said nut being formed with an annular flange 21, forming, with the under surface of the said nut, a suitable chamber 22. The inner surface of the said annular flange 21 is provided with suitably-disposed corrugations, flutings, or ribs, as 23, formed with channels or grooves 24 between each pair of said corrugations, flutings, or ribs 23. The arrangement of the said flange 21 and its corrugations, flutings, or ribs 23 is such that when the nut 19 is screwed upon the screw-threaded portion 8 of the bolt at a certain point the spring 14 and the disk or washer 9 will enter the chamber 22 of the nut, and the holding or locking end portion or member 16 of the said spring will be brought in engagement with the said corrugations, flutings, or ribs 23 and the channels or grooves 24 between them. In screwing the said nut upon the bolt by turning the nut in the direction of the arrow $y$ in said Fig. 4 the tension of the spring 14 is such that the said corrugations, flutings, or ribs will easily slide over the end and rounded portion 18 of the holding or locking portion or member 16 of the spring; but any return movement of the nut in the direction of the arrow $z$ in said Fig. 4 will be impossible, owing to the fact that such movement of the nut brings the end 17 of the holding portion or member 16 directly against the corrugation, fluting, or rib 23 adjacent to said end 17, whereby the unscrewing movement of the nut is impossible unless great force is applied to the polygonal sides of the nut, as in the case of the application of the jaws of a wrench thereto. The purpose of the previously-mentioned teat or tongue 11 of the disk or washer, which extends into the longitudinal groove or channel 12 in the bolt, is to guard against any rotary movement of the said disk or washer and its spring upon the said bolt, whereby a positive and effectively-operating nut-lock is the result.

The arrangement and manner of securing the spring 14 at its one end to the face of the washer, so as to be capable of oscillation in the plane of the face of the washer, is such that the vibratory slide member formed by the parts 16, 17, and 18 responds with each fluting as the nut is screwed on, because the action of the nut in this case is greater than the resisting power of the spring; but during any tendency of the nut unscrewing the resistance offered by the spring is greater than the unscrewing power of the nut. Hence the nut cannot become unscrewed except with the application of additional power applied by the operator upon the nut to make the unscrewing power upon the nut greater than the resistance of the spring.

It will thus be clearly evident that when the nut is tightly screwed home, so as to bring the disk or washer firmly against the face of the casting or part 5 or against the fish-plate 6, as shown in Figs. 1 and 3 of the drawings, the said nut will be held and locked in position against any accidental unscrewing or loosening of the nut no matter how much and how great the jarring may be.

When the nut-lock and nut are to be used with a carriage-bolt 25, (shown in Fig. 6 of the drawings,) a washer or disk 26 is used, which is provided with a locking or holding spring 14 in the manner above described and for engagement with the nut 19 aforesaid. With this form of washer or disk 26 I dispense with the inwardly-extending teat or tongue 11 used with the form of washer shown in Figs. 3, 4, and 5 of the drawings, the said washer or disk 26 being provided upon its opposite face with one or more points or prongs 27, which firmly embed themselves in the face of the body with which this form of nut-lock and nut are used to prevent the turning of the said washer or disk 26 when the nut is screwed home and locked or held against turning in precisely the same manner as set forth in connection with the form of device shown in Figs. 1 to 4, inclusive.

In Figs. 8, 9, and 10 of the drawings I have shown a machine-bolt provided with a nut-lock and nut of a modified form of construction, but still embodying the features of this invention.

In Fig. 8 the reference characters 28 and 29 indicate any two parts which are to be bolted together, and 30 is a bolt provided with a head 31 and screw-threaded portion 32. In this construction of nut-lock the washer or disk 33 is formed with a centrally-disposed hole for slipping it upon the bolt 30, the said hole being surrounded by an annular flange 34, formed with the alternately-disposed corrugations, flutings, or ribs 35 and depressions or grooves 36. The nut 37 is made with an annular flange 38, forming a chamber 39, and connected with a suitable post or pin 40, extending from the inner face of the said nut and projecting into said chamber 39, is the holding portion or member 42 of a spring 41. This spring is made with a holding or locking portion or member 43, which can be brought into its operative engagement with the corrugations, flutings, or ribs 35 and grooves or depressions 36 of the washer or disk 33, as will be clearly evident from an inspection of Figs. 8 and 9 of the drawings. That the said washer or disk 33 will be prevented from turning upon the bolt 30 the latter may be provided with a longitudinally-extending groove or slot 44, into which extends a teat or projection 45 on said washer or disk 33, as will be clearly understood from an inspection of said Figs. 8 and 9 of the drawings. The manner of producing the held or locked engagement of the said nut-lock with the nut is substantially that described in the foregoing specification, and the same will be clearly understood from the said Figs. 8 and 9.

From the foregoing description of my invention it will be clearly evident that I have devised a simply-constructed and operative device which will securely and positively lock or hold the nut upon the bolt against any accidental displacement after the holding devices of the washer or disk and the nut have been brought in engagement, and especially when the nut is driven home, but when desired the nut can be forcibly removed by unscrewing and without the necessity of destroying or damaging or removing any part of the nut-lock.

Having thus described my invention, what I claim is—

1. A nut-lock comprising a washer and a nut adapted to be screwed upon a bolt, a fixed holding-point located between the adjacent faces of said washer and nut, a vibratory holding device connected at one end with said fixed holding-point, said holding device being made from spring metal and having an engaging or retaining portion at its opposite end, said holding device being adapted to oscillate in the plane of the face of said washer, and a holding means also located between the adjacent faces of said washer and nut, with which the said engaging or retaining portion of said holding device is brought in engagement and yields during the rotative movement of the nut when screwed home, and all being arranged so that when the nut is screwed on the power exerted by the nut is greater than the resistance of the engaging or retaining portion of the holding device, but when the nut tends to unscrew, the resistance of the holding device is greater than the unscrewing power of the nut, under normal conditions, unless when additional manual power is applied to the nut, substantially as and for the purposes set forth.

2. A nut-lock comprising a washer and a nut adapted to be screwed upon a bolt, a fixed holding-point located between the adjacent faces of said washer and nut, a vibratory spring connected at its one end with said fixed holding-point, said spring having an engaging or retaining portion at its opposite end, said spring being adapted to oscillate in the plane of the face of the washer, and a holding means also located between the adjacent faces of said washer and nut, with which the engaging or retaining portion of said spring is brought in engagement and yields during the rotative movement of the nut when screwed home, and all being arranged so that when the nut is screwed on the power exerted by the nut is greater than the resistance of the engaging or retaining portion of the spring, but when the nut tends to unscrew, the resistance of said spring is greater than the unscrewing power of the nut, under normal conditions, unless when additional manual power is applied to the nut, substantially as and for the purposes set forth.

3. A nut-lock comprising a washer and a nut adapted to be screwed upon a bolt, a fluted holding means, a vibratory holding-spring oscillating in the plane of the face of the washer, said spring having one of its end portions fixed, and a V-shaped holding or retaining member on said spring adapted to be brought in engagement with said fluted holding means, substantially as and for the purposes set forth.

4. A nut-lock comprising a washer and a nut adapted to be screwed upon a bolt, said nut having a chambered portion, and a fluted holding means in said chambered portion, a vibratory holding-spring oscillating in the plane of the face of the washer, said spring having one of its end portions fixed, and a V-shaped holding or retaining member on said spring adapted to be brought in engagement with said fluted holding means, substantially as and for the purposes set forth.

5. In a nut-lock, the combination, with a bolt, of a washer on said bolt, a nut screwed on said bolt, a fixed holding-point extending laterally from the face of said washer, a vibratory holding device fixed at its one end to said fixed holding-point on said washer, said holding device being made from spring metal and having an engaging or retaining portion at its opposite and free end, said holding device being adapted to oscillate in the plane of the face of the washer, and means on said nut adapted to be moved longitudinally with the nut against and in slidable engagement with said engaging or retaining portion of said holding device, and yielding against the rotative movement of the nut when screwed home, and all being arranged so that when the nut is screwed on the power exerted by the nut is greater than the resistance of the free end of the holding device, but when the nut tends to unscrew, the resistance of the holding device is greater than the unscrewing power of the nut, under normal conditions, unless when additional manual power is applied to the nut, substantially as and for the purposes set forth.

6. In a nut-lock, the combination, with a bolt, of a washer on said bolt, a nut screwed on said bolt, said nut being provided with a chamber, a fixed holding-point extending laterally from the face of said washer, a vibratory holding device fixed at its one end to said fixed holding-point on said washer, said holding device being made from spring metal and having an engaging or retaining portion at the opposite and free end, said holding device being adapted to oscillate in the plane of the face of the washer, and means within the chamber of said nut adapted to be moved longitudinally with the nut against and in slidable engagement with said engaging or retaining portion of said holding device, and yielding against the rotative movement of the nut when screwed home, and all being arranged so that when the nut is screwed on the power exerted by the nut is greater than the resistance of the free end of the holding device, but when the nut tends to unscrew, the resistance of the holding device is greater than the unscrewing power of the nut, under normal conditions, unless when additional manual power is applied to the nut, substantially as and for the purposes set forth.

7. In a nut-lock, the combination, with a bolt having a longitudinally-extending channel or groove, of a washer on said bolt, a teat on said washer projecting into said channel or groove, a nut screwed on said bolt, a vibratory holding device fixed at its one end to the face of the washer, said holding device oscillating in the plane of the face of the washer and at right angles to the plane of the longitudinal axis of the bolt, and means on said nut, adapted to be brought in slidable engagement with the free end of said vibratory holding device when the nut is screwed home, and all arranged in such a manner, so that when the nut is screwed on, the power exerted by the nut is greater than the resistance of the holding device, but when the nut tends to unscrew, such resistance of the holding device is greater than the unscrewing power of the nut, unless additional manual power is applied to the nut, substantially as and for the purposes set forth.

8. In a nut-lock, the combination, with a bolt having a longitudinally-extending channel or groove, of a washer on said bolt, a teat on said washer projecting into said channel or groove, a nut screwed on said bolt, said nut being provided with a chamber, a vibratory holding device oscillating in the plane of the face of the washer and at right angles to the plane of the longitudinal axis of the bolt, and means in the chamber of said nut, adapted to be brought in slidable engagement with the free end of said vibratory holding device when the nut is screwed home, and all arranged in such a manner, so that when the nut is screwed on, the power exerted by the nut is greater than the resistance of the holding device, but when the nut tends to unscrew, such resistance of the holding device is greater than the unscrewing power of the nut, unless additional manual power is applied to the nut, substantially as and for the purposes set forth.

9. In a nut-lock, the combination, with a bolt, of a washer on said bolt, a nut screwed on said bolt, a fixed holding-point extending laterally from the face of said washer, a vibratory spring secured at its one end to said fixed holding-point on said washer, said spring oscillating in the plane of the face of the washer, and having an engaging or retaining portion at its opposite and free end, and means upon said nut with which the said engaging or retaining portion of the said spring is adapted to be brought in slidable engagement, and yielding against the rotative movement of the nut when screwed home, and all being arranged so that when the nut is screwed on the power exerted by the nut is greater than the resistance of the free end of said spring, but when the nut tends to unscrew, the resistance of the said spring is greater than the unscrewing power of the nut, under normal conditions, unless when additional manual power is applied to the nut, substantially as and for the purposes set forth.

10. In a nut-lock, the combination, with a bolt, of a washer on said bolt, a nut screwed on said bolt, said nut being provided with a chamber, a vibratory spring secured at one end to the face of said washer, said spring oscillating in the plane of the face of the washer and at right angles to the plane of the longitudinal axis of the bolt, and means within the chamber of said nut with which the opposite and free end of said spring is brought in slidable engagement when the nut is screwed home, and all arranged in such a manner, so that when the nut is screwed on, the power exerted by the nut is greater than the resistance of the holding device, but when the nut tends to unscrew, such resistance of the holding device is greater than the unscrewing power of the nut, unless additional manual power is applied to the nut, substantially as and for the purposes set forth.

11. In a nut-lock, the combination, with a bolt having a longitudinally-extending channel or groove, of a washer on said bolt, a teat on said washer projecting into said channel or groove, a nut screwed on said bolt, a vibratory spring secured at one end to the face of said washer, said spring oscillating in the plane of the face of the washer and at right angles to the plane of the longitudinal axis of the bolt, and means upon said nut with which the opposite and free end of said spring is brought in slidable engagement when the nut is screwed home, and all arranged in such a manner, so that when the nut is screwed on, the power exerted by the nut is greater than the resistance of the holding device, but when the nut tends to unscrew, such resistance of the holding device is greater than the unscrewing power of the nut, unless additional manual power is applied to the nut, substantially as and for the purposes set forth.

12. In a nut-lock, the combination, with a bolt having a longitudinally-extending channel or groove, of a washer on said bolt, a teat on said washer projecting into said channel or groove, a nut screwed on said bolt, said nut being provided with a chamber, a vibratory spring secured at one end to the face of said washer, said spring oscillating in the plane of the face of the washer and at right angles to the plane of the longitudinal axis of the bolt, and means within the chamber of said nut with which the opposite and free end of said spring is brought in slidable engagement when the nut is screwed home, and all arranged in such a manner, so that when the nut is screwed on, the power exerted by the nut is greater than the resistance of the holding device, but when the nut tends to unscrew, such resistance of the holding device is greater than the unscrewing power of the nut, unless additional manual power is applied to the nut, substantially as and for the purposes set forth.

13. In a nut-lock, the combination, with a bolt, of a washer on said bolt, a nut screwed on said bolt, a series of corrugations and depressions on said nut, and a vibratory spring secured at its one end to the face of said washer, said spring oscillating in the plane of the face of the washer and at right angles to the plane of the longitudinal axis of the bolt, and having its opposite end in slidable engagement with said corrugations and depressions, and all arranged in such a manner, so that when the nut is screwed on, the power exerted by the nut is greater than the resistance of the holding device, but when the nut tends to unscrew, such resistance of the holding device is greater than the unscrewing power of the nut, unless additional manual power is applied to the nut, substantially as and for the purposes set forth.

14. In a nut-lock, the combination, with a bolt, of a washer on said bolt, a nut screwed on said bolt, an annular flange on said nut, a series of corrugations and depressions upon the inner face of said flange, and a vibratory spring secured at one end to the face of said washer, said spring oscillating in the plane of the face of the washer and at right angles to the plane of the longitudinal axis of the bolt, and having its opposite end in slidable engagement with said corrugations and depressions, and all arranged in such a manner, so that when the nut is screwed on, the power exerted by the nut is greater than the resistance of the holding device, but when the nut tends to unscrew, such resistance of the holding device is greater than the unscrewing power of the nut, unless additional manual power is applied to the nut, substantially as and for the purposes set forth.

15. In a nut-lock, the combination, with a bolt having a longitudinally-extending channel or groove, of a washer on said bolt, a teat on said washer projecting into said channel or groove, a nut screwed on said bolt, an annular flange on said nut, a series of corrugations and depressions upon the inner face of said flange, and a vibratory spring secured at one end to the face of said washer, said spring oscillating in the plane of the face of the washer and at right angles to the plane of the longitudinal axis of the bolt, and having its opposite end in slidable engagement with said corrugations and depressions, and all arranged in such a manner, so that when the nut is screwed on, the power exerted by the nut is greater than the resistance of the holding device, but when the nut tends to unscrew, such resistance of the holding device is greater than the unscrewing power of the nut, unless additional manual power is applied to the nut, substantially as and for the purposes set forth.

16. In a nut-lock, the combination, with a bolt, of a washer on said bolt, a laterally-extending post on said washer, a vibratory spring connected at its one end with said post, said spring oscillating in the plane of the face of the washer and at right angles to the plane of the longitudinal axis of the bolt, and an angular holding member at the opposite end of said spring, a nut screwed on said bolt, an annular flange on said nut, and a series of corrugations and depressions upon the inner face of said flange with which the angular holding member of said spring is adapted to be brought in slidable engagement, and all arranged in such a manner, so that when the nut is screwed on, the power exerted by the nut is greater than the resistance of the holding device, but when the nut tends to unscrew, such resistance of the holding device is greater than the unscrewing power of the nut, unless additional manual power is applied to the nut, substantially as and for the purposes set forth.

17. In a nut-lock, the combination, with a bolt having a longitudinally-extending channel or groove, of a washer on said bolt, a teat on said washer projecting into said channel or groove, a laterally-extending post on said washer, a vibratory spring connected at its one end with said post, said spring oscillating in the plane of the face of the washer and at right angles to the plane of the longitudinal axis of the bolt, and an angular holding member at the opposite end of said spring, a nut screwed on said bolt, an annular flange on said nut, and a series of corrugations and depressions upon the inner face of said flange with which the angular slidable member of said spring is adapted to be brought in holding engagement, and all arranged in such a manner, so that when the nut is screwed on, the power exerted by the nut is greater than the resistance of the holding device, but when the nut tends to unscrew, such resistance of the holding device is greater than the unscrewing power of the nut, unless additional manual power is applied to the nut, substantially as and for the purposes set forth.

In testimony that I claim the invention set forth above I have hereunto set my hand this 4th day of March, 1905.

JOHN STRACK.

Witnesses:
 FRANK BRABSON,
 FREDK. C. FRAENTZEL.